July 16, 1946.　　D. M. WILLIAMS　　2,404,154
BUCK RAKE STACKER
Filed Oct. 19, 1944　　3 Sheets-Sheet 3
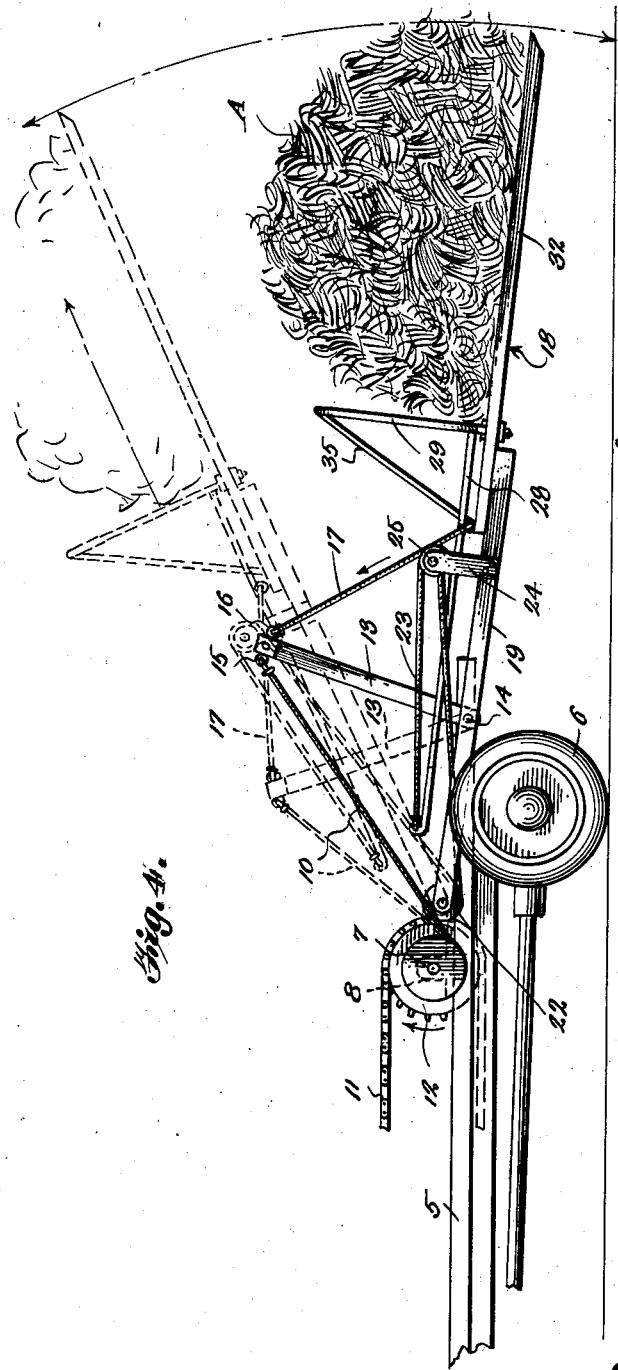
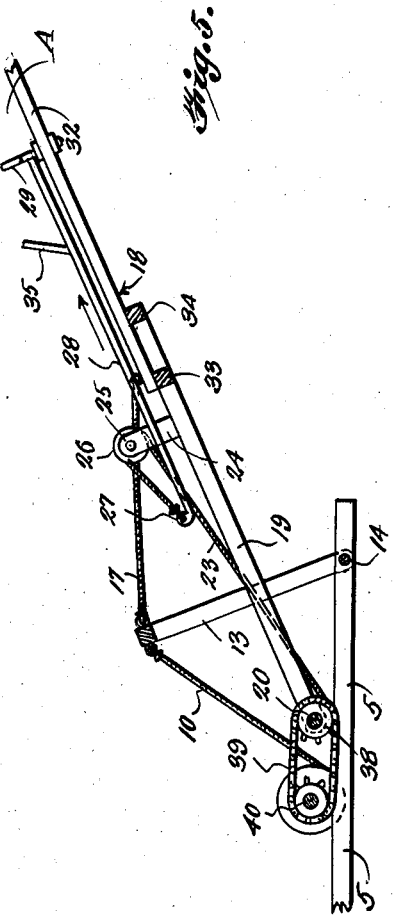
Inventor
DAYTON M. WILLIAMS
By L. F. Randolph
Attorney Patented July 16, 1946

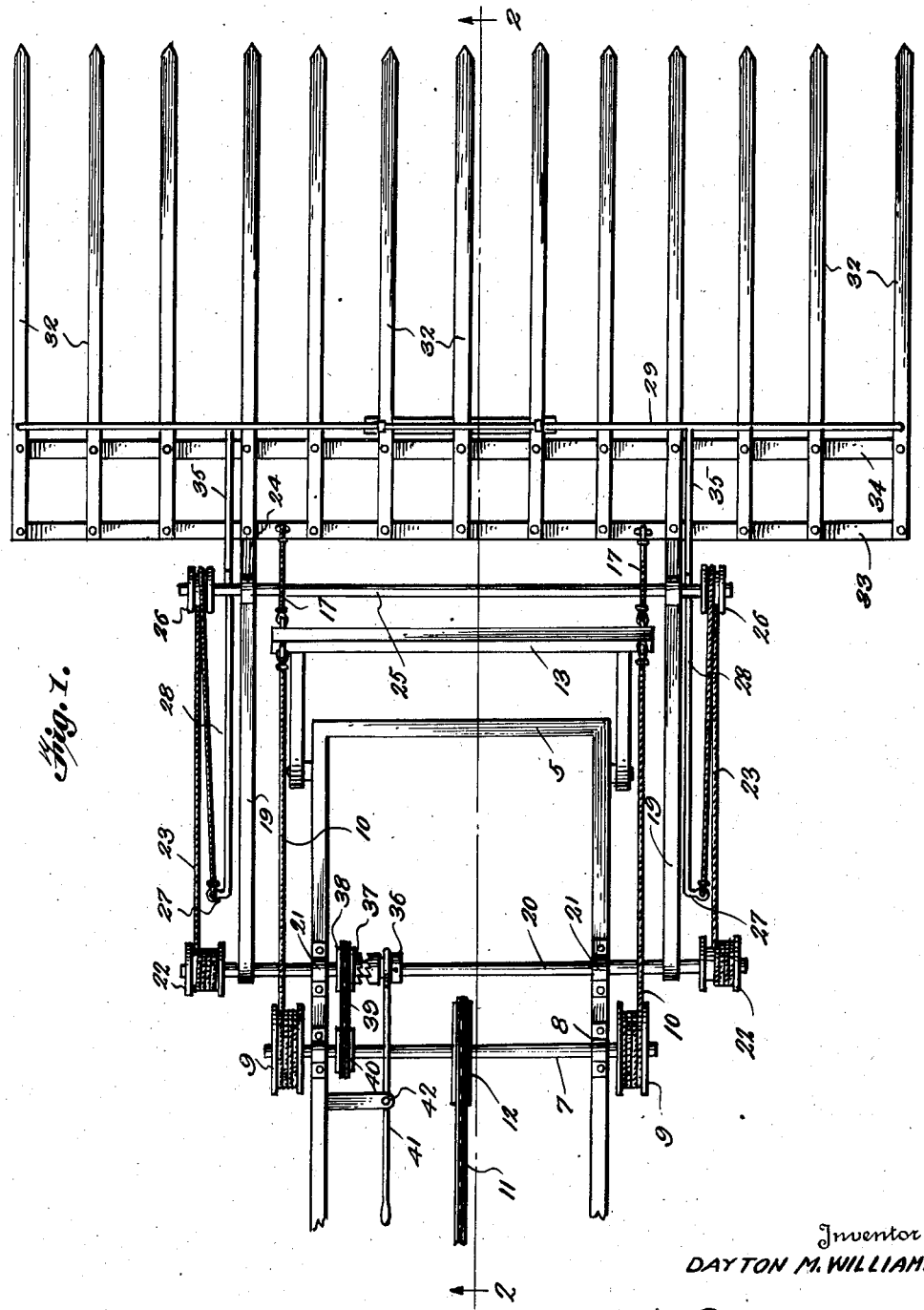

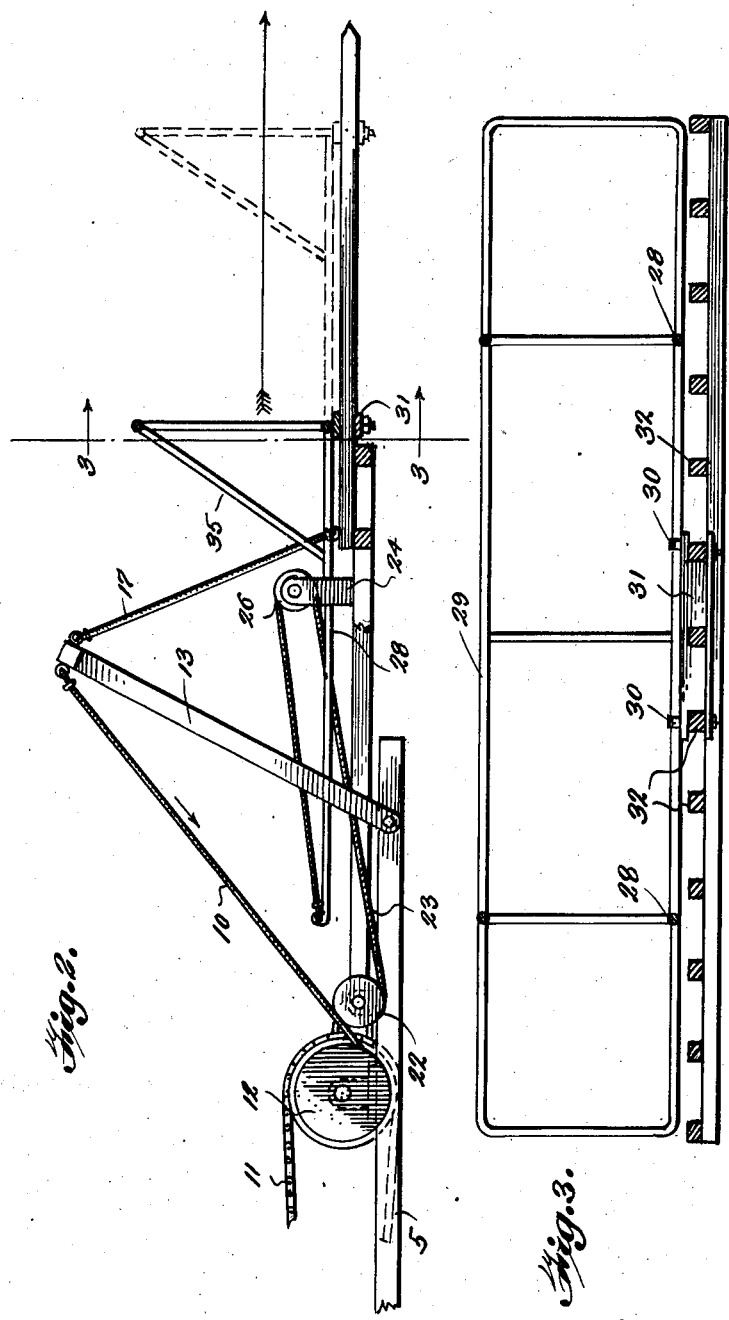

2,404,154

UNITED STATES PATENT OFFICE 2,404,154

BUCK RAKE STACKER

Dayton M. Williams, Bynumville, Mo.

Application October 19, 1944, Serial No. 559,336

2 Claims. (Cl. 214—82)

This invention relates to new and useful improvements in rakes and the principal object is to combine a buck rake with certain other factors including the ability to scoop and stack hay and other crops.

Another important object of the invention is to provide a buck rake with means for raising and lowering the same and forcing hay or other material off of the tines thereof when dumping of the rake is desired.

Other important objects and advantages of the invention shall become apparent to the reader of the following description.

In the drawings:

Figure 1 is a fragmentary top plan view.

Figure 2 is a longitudinal sectional view.

Figure 3 is a section taken on line 3—3 of Figure 2.

Figure 4 is a fragmentary side elevational view showing the rake loaded and in a slightly elevated position.

Figure 5 is a fragmentary longitudinal sectional view showing the rake elevated and the load in the act of being dumped.

Referring to the drawings wherein like numerals designate like parts, it can be seen that numeral 5 denotes a frame or platform supported by wheels 6. This may be a truck or attachment for a tractor. A horizontal transverse shaft 7 is supported by bearings 8 and at each end has a drum 9 on which is wound a cable 10. A drive chain 11 is trained over a sprocket wheel 12 on the shaft 7 and in this manner the shaft 7 is driven.

A walking frame 13 is pivotally secured at its lower end as at 14, to the frame 5 and has eyes 15 at the rear side of its upper portion to which the cables 10 connect. The upper portion of the front side of the frame 13 has eyes 16 to which short cables 17 connect and these cables 17 extend to connect to a buck rake assembly generally referred to by numeral 18.

The rake assembly 18 consists of a pair of arms 19, the inner ends of which have openings to receive a transverse shaft 20 supported by bearings 21 on the frame 5.

The ends of the shaft 20 are provided with drums 22 on which cables 23 are wound.

Supported by uprights 24 on the arms 19 is a shaft 25 having pulleys 26 thereon over which the cables 23 are trained, these cables extending backwardly to connect to upstanding lugs 27 on the inner ends of pusher bars 28. The pusher bars 28 project rearwardly from a horizontally disposed rectangular shaped pusher frame 29 which is secured by suitable means 30 to the top side of a slide block 31, this block 31 having an opening at its intermediate portion and its end portion bifurcated, as shown in Figures 1 and 3.

The rake 18 includes a plurality of tines 32 which are secured as shown in Figure 1 to transverse connecting bars 33, 34, these bars in turn being secured to the arms 19 (see Figure 5).

The ends of the block 31 are bifurcated and the opening formed in the intermediate portion, for the purpose of receiving the three intermediate tines 32 of the rake (see Figure 3). Suitable brace members 35 are provided for the back side of the pusher frame 29.

On the shaft 20 is a splined clutch element 36 engageable with a freely rotatable clutch element 37 immovable longitudinally on the shaft 20, this clutch element 37 having a sprocket wheel 38 thereon driven by chain 39 trained over a sprocket wheel 40 on the shaft 7. An elongated forked hand lever 41, fulcrumed as at 42 is employed for shifting the clutch element 36.

When the power plant (not shown) is in operation, the shaft 7 can be made to turn in one direction or the other for the purpose of lifting or lowering the rake assembly 18. Of course the entire vehicle is moved when it is desired to rake up material on to the rake 18, after which the shaft 7 is rotated clockwise, as shown in Figure 2, to elevate the rake assembly 18, this by the action of the swingable walking frame 13. With the load in the position shown in Figure 4, the vehicle can be driven to an unloading point, where, if a stack is to be formed, the rake assembly can be elevated to the desired elevation as shown in the broken lines in Figure 4. With the rake assembly in loading disposition, the clutch element 36 can be shifted to engage clutch element 37, thus connecting the shaft 7 with the shaft 20. Winding of the cables 23, 23 on the drum 22, 22 will serve to force the bars 28 forwardly. Thus the bars 28 in moving forwardly shift the pusher frame 28 toward the tips of the tines 32, with the result, that the hay or other material A is displaced from the rake assembly onto the stack.

Obviously, the mechanism above described may be operated hydraulically or through any other power medium.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. A buck rake and stacker comprising a main frame, a drive shaft rotatably mounted across the main frame, drums carried by said drive shaft and disposed outwardly from opposite sides of the main frame, a rake in front of said main frame and having rearwardly extending arms spaced outwardly from opposite sides of the main frame, a driven shaft rotatably mounted across the main frame in front of the drive shaft with end portions projecting outwardly from opposite sides of the main frame, said arms having their rear ends pivoted upon the driven shaft and mounting the fork for swinging vertically to raised and lowered positions, a walking frame pivoted to opposite sides of the main frame forwardly of the driven shaft, cables connecting the upper free end of the walking frame with the rear portion of said fork, cables connected with the upper portion of the walking frame and extending rearwardly therefrom and wound upon the drums of the drive shaft, a pusher frame slideable forwardly and rearwardly along tines of said fork, pusher bowers extending rearwardly from the pusher frame outwardly of the rearwardly extending arms of the fork and having their rear ends bent to form outstanding lugs, bearings extending upwardly from the rearwardly extending arms of the fork, a shaft rotatably mounted through the bearings with its ends projecting outwardly from the pusher bowers, pulleys carried by the protecting ends of the last mentioned shaft, drums carried by the projecting ends of the driven shaft, cables attached to the lugs of the pusher bowers and extended forwardly and trained about the pulleys and then extended rearwardly and wound upon the drums of the driven shaft, and means for transmitting rotary movement from the drive shaft to the driven shaft including a clutch for controlling rotation of the driven shaft.

2. A buck rake stacker comprising a main frame, a drive shaft rotatably mounted across the main frame, a driven shaft rotatably mounted across the main frame forwardly of the drive shaft and rotated from the main shaft, drums carried by the drive shaft and the driven shaft, a buck rake in front of the main frame having arms extending rearwardly therefrom at opposite sides of the main frame and pivoted to the drive shaft and mounting the rake for vertical swinging movement to adjusted position, a pusher frame over said fork, a block mounted under the pusher frame transversely thereof and upon which passages slideably receiving tines of the fork and mounting the pusher frame for movement forwardly and rearwardly upon the fork are formed, pusher bowers extending rearwardly from the pusher frame, bearings extending upwardly from the bowers of the fork, a shaft rotatably mounted through the bearings, pulleys carried by the last mentioned shaft, cables connected with rear ends of the pusher bowers and extended forwardly and trained about said pulleys and then extended rearwardly and wound about the drums carried by the driven shaft, a walking frame extending upwardly from the main frame and having arms pivoted to the main frame at opposite sides thereof, cables extending forwardly from the upper end of the walking frame and secured to the rear portion of the buck rake, and cables connected with the upper portion of the walking frame and extending rearwardly therefrom and wound about the drums of the main shaft.

DAYTON M. WILLIAMS.